Figure 1:
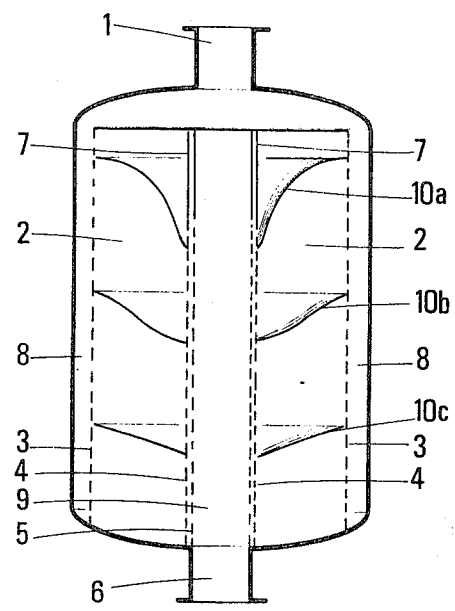

United States Patent
Boret et al.

[11] 3,909,208
[45] Sept. 30, 1975

[54] APPARATUS FOR HYDROCARBON CONVERSION

[75] Inventors: Roger Boret, Le Pecq; Charles Bronner, Chatou; Roland Huin, Montesson-la-Borde; André Vidal, Le Vesinet, all of France

[73] Assignee: Institut Francais du Petrole des Carburants et Lubrifiants, Rueil-Malmaison, France

[22] Filed: Dec. 13, 1972

[21] Appl. No.: 314,587

[30] Foreign Application Priority Data
Dec. 17, 1971  France .............................. 71.45656

[52] U.S. Cl. ............... 23/288 R; 23/288 G; 208/146
[51] Int. Cl. ........ B01j 9/04; B01j 9/08; C10g 13/00
[58] Field of Search .......... 23/288 R, 288 G, 288 E, 23/288 B, 288 C, 288 D; 208/146, 108, 134, 143, 152, 165, 169; 260/684, 690, 696; 196/115, 133

[56] References Cited
UNITED STATES PATENTS

| | | | |
|---|---|---|---|
| 2,512,562 | 6/1950 | Cummings | 23/288 R |
| 2,835,560 | 5/1958 | Bason et al. | 23/288 R |
| 3,027,244 | 3/1962 | Byrne et al. | 23/288 R |
| 3,436,192 | 4/1969 | Karlsson | 23/288 R |
| 3,620,685 | 11/1971 | Rogers et al. | 23/288 R |
| 3,706,536 | 12/1972 | Greenwood et al. | 23/288 G |

*Primary Examiner*—Joseph Scovronek
*Attorney, Agent, or Firm*—Millen, Raptes & White

[57] ABSTRACT

A catalytic reaction chamber of the radial flow type comprising an external distribution chamber, an annular zone for the catalyst bed, limited by two perforated walls and a central manifold including a screen of inverted truncated cone shape extending downwardly from the top of the catalytic zone. Optionally, the higher portion of the external perforated wall may have the shape of a truncated cone.

9 Claims, 4 Drawing Figures

APPARATUS FOR HYDROCARBON CONVERSION

Most of the reactors used in the petroleum industry, for example for the catalytic conversion of hydrocarbons, and which contain, for example, catalytic fixed or moving beds, are either of the axial type or of the radial type.

The catalysts usually consist of at least one metal, for example a metal from groups VIII, VI A and VII A, or a metal from another group, said metal being deposited on a conventional carrier, for example alumina, silica, alumina-silica and the like.

When using a substantially vertical axial reactor whose bottom has a spheroidal or ellipsoidal shape, the feed charge or the reactants are introduced at the top of the reactor, through distribution means, and usually pass through a layer of solid material consisting essentially of the catalyst carrier, this solid material being usually employed in the form of balls; the object of this layer is to provide for a better distribution of the reactants through the catalyst bed. After their passage through the reactor, the reactants pass, for example, through two layers of balls of different grain size essentially consisting of catalyst carrier, one for retaining the catalyst and the other (of higher grain size) for improving the recovery of the products through the manifold located at the bottom of the reactor, while retaining the catalyst and alumina located thereupon.

The main disadvantage of the axial reactors, where the reactants circulate vertically, downwardly, along a path parallel to the axis of the reactor (wherefrom is derived the term "axial reactor"), is the need of a large cross-section and a relatively reduced height of the catalyst bed, so that the pressure drop be not too high; the dead volume of these reactors at their spherical or ellipsoidal ends makes them uneconomical.

In the radial reactors, the catalyst bed has the shape of a vertical cylindrical ring limited internally by a grid retaining the catalyst and externally either by the reactor wall and by "scallops" or "shells", or by a second grid of the same type as the internal grid. The reactants are supplied to the top of the reactor and are distributed inside the catalyst bed either by the scallops or by the empty space located between the external grid which retains the catalyst and the reactor wall. The circulation inside the catalyst bed is carried out from the outside to the inside, substantially along the radii of the reactor (which explains the term "radial reactor"); after their passage through the catalyst bed, the reactants are collected in a vertical cylindrical manifold through the internal grid which retains the catalyst and a slightly perforated iron-plate adapted to ensure a better distribution of the reactants through the catalyst bed by preventing the formation of preferential paths therethrough.

The main disadvantage of the radial reactors results from a progressive packing of the catalyst. This packing leaves an empty space at the top of the catalyst bed, which space makes the preferential passage of the reactants easier. In order to prevent the formation of such preferential passages, it was usual to place at the top of the manifold, a baffle plate of convenient length which deviates downwardly the flow of the reactants thus making their path longer. This embodiment has improved the efficiency of the radial reactors.

On the other hand, when it is desired, in order to maintain the activity level of a catalyst located in a radial reactor, to replace the used catalyst, by fresh catalyst, it is necessary to provide means for continuously or periodically withdrawing the catalyst from the bottom of the reactor, and feeding the top of the reactor with fresh catalyst.

This withdrawal is possible only by controlling the horizontal component of the force exerted by the reactants on the catalyst grain with respect to the vertical component thereof plus the gravity force. This result is obtained by providing the top of the central manifold with a baffle-plate. This embodiment makes possible the withdrawal of the catalyst by downwardly deviating the path of the reactants and increasing the vertical component of the force exerted by the reactants on the catalyst grains.

FIG. 1 is a view of such a baffle-plate in a reactor. For sake of simplicity of the diagram, the reactor shown contains only one catalyst enclosure; but it is also possible to make use of a reactor having several superimposed catalyst enclosures. Several reactors arranged in series or in parallel may also be used, each containing one or several catalyst enclosures. FIG. 1 is not a part of the invention; it is only given for documentation purposes, in order to facilitate the understanding of the improvements of the invention. The reactor consists of an elongated vertical and cylindrical chamber; its bottom is ellipsoidal; it comprises an annular enclosure 2 which contains the catalyst bed; the wall 3 of this enclosure, hereinafter referred to as "external wall" of the enclosure, and the wall 4 of this enclosure, hereinafter referred to as "internal wall" of the enclosure, are cylindrical and usually in the form of a grid adapted to retain the catalyst inside the enclosure and to let the reactants go in and out the enclosure (in fact, instead of a grid, a perforated iron-sheet or a wall of inert sintered material may be used). The reactants are supplied to the reactor through the inlet 1; they flow thereafter through the distributor 8, hereinafter referred to as external distributor, which consists of the space between the walls of the reactor and the external grid 3 (this distributor is adjacent to the annular enclosure 2).

From the distributor 8, the reactants pass through the external grid 3 and the catalyst bed of the annular enclosure 2. They are withdrawn through the grid 4 (and preferably also through a slightly perforated wall 5 which is usually a perforated iron plate adapted to provide for a better distribution of the reactants throughout the catalyst bed by preventing the formation of preferential paths therethrough), are collected in the manifold 9 (hereinafter called internal manifold and which is the internal space of the reaction vessel 1 limited by the internal wall of the annular enclosure 2) and are discharged through the outlet duct 6.

The screen 7 which has for object to deviate downwardly the path of the reactants in the upper part of the annular enclosure consists of an unperforated cylindrical wall which has the same axis as the internal cylindrical wall (grid 4) of the annular enclosure 2, in extension of this internal cylindrical wall.

Usually the height of the screen 7 is from 50 to 400 % and preferably from 100 to 300 % of the distance between wall 3 and wall 4 of the annular enclosure 2.

The addition of such a screen suffers from inconveniences; the major inconvenience of this screen, placed at the top of the collector of the radial reactors, is that the part of the catalyst bed placed at the level of this screen does not fully participate in the reaction since the reactants passing therethrough are, as an average, in lower amount than the reactants passing through the rest of the catalyst bed; this results in a greater coke deposit on the catalyst grains since the severity of the operation is greater, the liquid feed rate by weight of PPH (hourly weight of liquid charge per weight unit of catalyst) being substantially lower in the upper part of the catalyst bed than in the rest of the bed.

Finally, the experience has shown that, in a radial reactor, whose central manifold is provided at its top with a screen, the path of the reactants in the portion of the catalyst bed located at the level of the screen (path 10a on FIG. 1), may consist of (a) a substantially horizontal path perpendicular to the inlet grid through which the reactants are introduced, (b) an oblique path and (c) a relatively short horizontal path at the base of the screen 7. In the lower portion of the catalyst bed, the reactant paths (paths 10b and 10c) are less sloped and are close to a horizontal line at the bottom of the reactor.

These three paths differ by their shape and length and by the amounts of reactants flowing along these paths.

Thus the liquid feed rate by weight or PPH is low in the portion of the catalyst bed located at the level of the screen, as compared to the average PPH in the reactor, for the following reasons: on the one hand, because the amount of reactant is relatively lower than in the rest of the reactor and, on the other hand, because the amount of catalyst concerned is greater, as a result of the greater length of the path 10a as compared to the paths 10b and 10c.

Furthermore, it has been observed that the paths, such as those of the type 10a, join at the foot of the screen 7. Although only a minor part of the reactants has followed such paths as 10a, it is clear that the position of all these paths results in a gathering of material at the foot of the screen 7; this gathering results in overload in the upper portion of the exhaust manifold 9.

Thus a radial reactor whose central manifold is provided with a cylindrical screen at its upper part has two main disadvantages:
 a. a low rate of use of the catalyst in the zone located at the level of the cylindrical screen placed on the central manifold,
 b. an overload at the foot of this screen, where the reaction products are discharged into the central manifold.

The object of this invention is a radial reactor containing a fixed or moving bed of catalyst which provides for a better efficiency of the catalyst located at the level of the screen placed on the central manifold.

The apparatus of the invention, which may be used for carrying out hydrocarbon conversions in the presence of a catalyst, comprises at least one elongated substantially vertical enclosure, whose section by an horizontal plane consists of a closed curvilinear line, usually a circle or an ellipse, and whose bottom has, for example, a spheroidal or ellipsoidal shape. The elongated enclosure contains at least one annular enclosure, adapted to receive a fixed or moving bed of catalyst, located substantially vertically in the elongated enclosure, each annular enclosure being limited by two cylindrical walls between which the said annular enclosure extends, the cylindrical wall which is closer to the walls of the elongated enclosure being referred to as "external wall of the annular enclosure" and the other one being as the "internal wall of the annular enclosure".

The apparatus further comprises:
 an internal manifold adjacent to each annular enclosure and comprising the internal space of the elongated enclosure limited by the internal cylindrical wall of each annular enclosure;
 an external feed space adjacent to each annular enclosure and formed of the space limited by the walls of the elongated enclosure and the external cylindrical wall of each annular enclosure;
 an inlet communicating with the external feed space adjacent to each annular enclosure for feeding the reactants;
 an outlet communicating with the internal manifold adjacent to each annular enclosure for discharging the reaction products;
 means for introducing the catalyst at the top of each annular enclosure;
 means for withdrawing the catalyst from the bottom of each annular enclosure;
 optionally, a perforated cylindrical wall between the internal wall of each annular enclosure and the manifold internal to each annular enclosure (the perforated area of this wall is usually from 2 to 7 % of the total area of the perforated wall).

The apparatus of the invention is first characterized in that the upper portion of the internal wall of each annular enclosure is provided with a screen whose object is to impede any discharge of reactants from each annular enclosure at the top of the internal manifold adjacent to each annular enclosure, this screen having a height of from 50 to 400 % and preferably from 100 to 300 % of the distance between wall 3 and wall 4 of each annular enclosure and having the shape of an inverted truncated cone of upwardly increasing section. This inverted truncated cone has the same axis as the internal cylindrical wall of each annular enclosure, the area of the smaller of the two bases of the truncated cone being substantially equal to the area of the cross-section of the internal cylindrical wall of each annular enclosure and the angle formed by the axis of this truncated cone with any one of its generatrices being in the range of from 2° to 55°, preferably from 10° to 30°.

Figure 2:
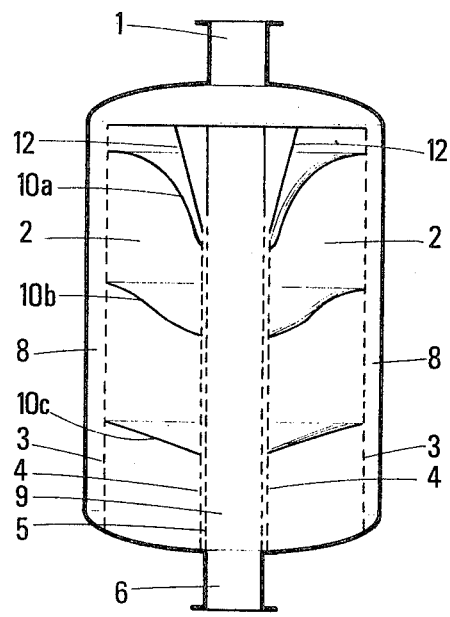

In other words, in order to reduce the amount of insufficiently employed catalyst, it has been found that it was quite advantageous to replace the cylindrical screen 7 of FIG. 1 by the screen 12 of inverted cone shape, as shown in FIG. 2, in which the angle formed by the axis of the truncated cone with the generatrix is well-determined, mainly in terms of the operating conditions, such as the feed rates, the velocities of the reactants and the pressures inside the annular enclosure 2.

One or more reactors may be used, each containing one or more catalytic enclosures, either surperimposed, as explained in the French Patent Application PV No. 71/41069, of the 16th of November 1971, or arranged in series or in parallel.

According to an optional embodiment, the apparatus of the invention may also be characterized in that the external wall of each annular enclosure may have the shape of a truncated cone (not a cylinder as for the rest of this external wall) in its upper portion, representing from 10 to 40% of the height of each annular enclosure, the section of this truncated cone increasing downwardly, the larger of the two bases of this truncated cone being substantially equal to the area of the section of the external cylindrical wall of the annular enclosure, and the angle formed by the axis of this truncated cone with any one of its generatrices being in the range of from 2° to 55°, preferably from 10° to 40°.

Figure 3:
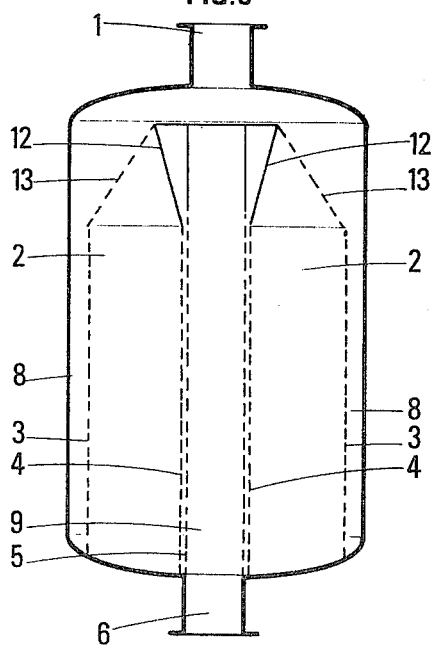

In other words, the upper part of the grid 3 through which the reactants are admitted is replaced by a grid 13 of truncated cone shape as shown in FIG. 3.

The height of this portion of truncated cone shape of the external wall 3 is usually substantially equal to the height of the truncated cone 12.

These improved features (the screen of truncated cone shape 12 or both the screen of truncated cone shape 12 and the grid 13 of truncated cone shape) have the advantages that the shapes of the screen 12 and the inlet grid 13 of truncated cone shape do not disturb the flow of the reactants through the catalyst bed, while a portion of the catalyst is spared, which portion would otherwise be insufficiently employed.

On the other hand, it must be pointed out that the overload at the foot part of the screen 12, placed on the collector 9 limits the amount of reactants in contact with the catalyst located at the level of the screen 12. If this overload is avoided, the residence time of the reactants in the catalyst bed is reduced, and accordingly the loss of catalyst activity during time is also reduced.

In order to avoid the overload at the foot part of the screen 12, placed at the upper part of the central collector 9, while maintaining the same pressure drop through the perforated wall 5, usually a perforated iron-plate, the apparatus may be improved by slightly modifying the perforated wall 5 in two possible ways:

a. either by providing the perforated wall or internal distributor, 5, near the foot part of the screen 12, with the same arrangement of the perforations but a greater size of these perforations so that, near the foot part of the screen, the area of the perforations of this wall be from 1.5 to 4 times the area of the perforations of the perforated wall below said zone, the latter surface being itself from 2 to 7 % of the total area of the perforated wall (by near the screen, it is meant the upper portion of the perforated wall whose height amounts to about 5–40 % of the total height of the perforated wall, said perforated wall extending from the bottom of the annular enclosure up to the foot of the screen);

b. or by providing the perforated wall 5 with the same perforations over its whole length, i.e. the same arrangement and size of the perforations all along the perforated wall, but extending this perforated wall below the screen 12, i.e. upwardly, beyond the lower level of the screen, by a length of from about 10 to 40 % of the height of the screen.

It is obvious that the two preceding solutions a) and b) may be used together.

Inside a reactor according to the invention, the catalyst may be present in any known shape, for example as conglomerates (for example extrudates); it may also be used in the form of grains, for example in the form of spherical balls of a diameter from 1 to 3 mm, preferably from 1.5 to 2 mm, these values being not limitative. The density in bulk of a catalyst used in the form of balls is usually from 0.4 to 1, preferably from 0.5 to 0.9 and particularly from 0.6 to 0.8, these values being not limitative.

The reactors of the invention may be used for carrying out various reactions, for example reforming, hydrogenation, dehydrogenation of, for example, paraffins or naphthenes, isomerization, aromatization of hydrocarbons, dehydrocyclization and hydrocracking.

These reactions are usually carried out at temperatures in the general range of from 300° to 600°C.

The reforming reactions are usually carried out at a temperature of from about 450° to 580°C, under a pressure of from about 5 to 20 kg/cm$^2$, the hourly reaction rate being from 0.5 to 10 volumes of liquid charge (naphtha distilling between about 60° and 220°C) per volume of catalyst.

The hydrogenation reactions are usually conducted at a temperature of from 100° to 500°C, under a pressure of from 1 to 40 kg/cm$^2$.

The isomerization reactions are usually carried out at a temperature of about 200° to 600°C, under a pressure of about 0.05 to 70 kg/cm$^2$, the hourly feed rate being from 0.1 to 10 times the catalyst volume.

The dehydrogenation reactions, e.g. of paraffins and the aromatization reactions are usually carried out at a temperature of about 300° to 650°C, under a pressure of about 0.1 to 60 kg/cm$^2$, the hourly feed rate of charge being 0.1 to 20 times the catalyst volume.

The hydrocracking reactions are usually carried out at about 260° to 530°C under a pressure of about 30 to 80 kg/cm$^2$.

EXAMPLE 1

This example is not within the scope of the invention; it is given only for comparison purposes; the radial reactor is provided with a cylindrical screen, not a screen of truncated cone shape.

In a catalytic reforming unit, there is used a radial reactor having the following characteristics:
Amount of catalyst: 5 metric tons
Diameter of the external wall of the annular enclosure: 1.70 meter
Diameter of the internal wall of the annular enclosure: 0.80 meter
Height of the catalyst bed: 4.70 meters
Height of the cylindrical screen placed at the upper portion of the internal wall of the annular enclosure: 0.80 meter
Height of the internal wall of the annular enclosure: 3.90 meters.

The fresh charge feeding rate in the unit is 75 metric tons per hour. An overall PPH (liquid velocity by weight) may be defined for this reactor:

$$\text{overall PPH} = \frac{\text{Fresh charge feed rate}}{\text{Amount of catalyst}} = \frac{75}{5} = 15$$

A local PPH may be defined for the path of the reactants:
for a path located at the top of the reactor, at the level of the screen (path 10a of the FIGS. 1 and 2), the PPH is very low;
for a path starting at the level of the foot of the cylindrical wall (path 10b of the FIGS. 1 and 2), the PPH is substantially equal to the overall PPH;
for a path located at the bottom of the reactor (path 10c of the FIGS. 1 and 2), the PPH is higher than the overall PPH.

The variation of the local PPH may be shown on a diagram (see FIG. 4, curve a): the local PPH are given in ordinates and the abscissae give the level h at the beginning of a path for the reactants, with the proviso that the top of the catalyst bed is at the level 0 and the foot of the catalyst bed at the level 4.70 meters.

In this example 1, the internal manifold is limited, in its upper portion, by the cylindrical screen and a perforated cylindrical wall (iron-plate) whose perforations amount to 8% of the surface in the upper portion of the wall, over an height of 0.3 meter, and 4 % in the lower portion of the wall, over an height of 3.60 meters.

EXAMPLE 2

Figure 4:
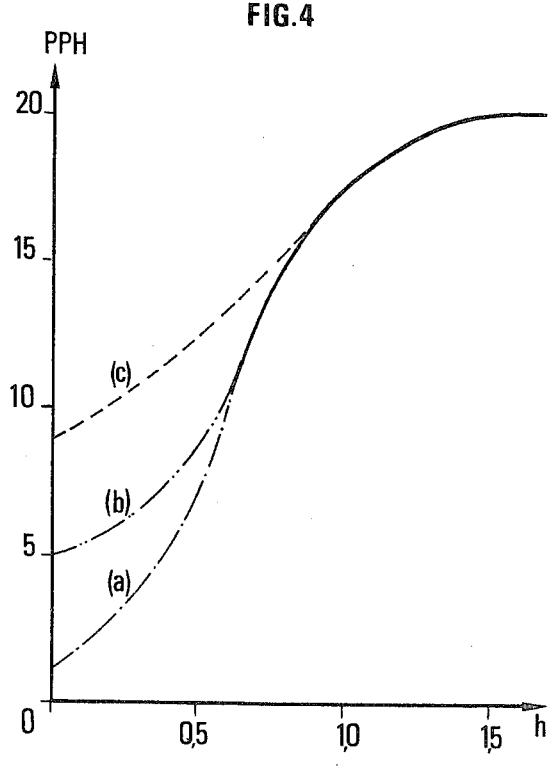

The reactor is the same as in example 1, except that the cylindrical screen has been replaced by a screen of truncated cone shape whose bottom portion has a diameter of 0.80 meter, equal to the diameter of the internal wall of the annular enclosure, and whose top portion has a diameter of 1.20 meter, the angle of the axis of this truncated cone with one of its generatrices being about 14°. Curve *b* of the FIG. 4 is a representation of the local PPH as a function of the level.

It is apparent from this example that the catalyst is not so severely used in the upper portion of the catalyst bed; 140kg of catalyst being thus saved.

EXAMPLE 3

The reactor is the same as in example 2, except that the upper portion of the external wall of the annular enclosure over a height of 0.8 m has also been replaced by a wall of truncated cone shape whose lower base has a diameter of 1.70 meter and the upper base a diameter of 1.30 meter; the angle formed by the axis of this truncated cone with one of its generatrices is about 14 degrees. The curve (*c*) of FIG. 4 represents the local PPh in terms of the level.

The catalyst is used more efficiently than in the preceding example (the PPH is closer to the average value) and 240 kg of catalyst are spared with respect to example 1 (i.e. 7.6 % of the catalyst).

What we claim is:

1. An apparatus for converting hydrocarbons in the presence of a catalyst, which comprises a substantially vertical elongated enclosure whose section by a horizontal place is curvilinear, said elongated enclosure containing an annular enclosure for receiving a bed of catalyst, arranged substantially vertically in the elongated enclosure, said annular enclosure being defined between two cylindrical perforated walls, the cylindrical perforated wall which is closer to the walls of the elongated enclosure being referred to as "external wall of the annular enclosure" and the other being referred to as "internal wall of the annular enclosure", said perforated walls being for radial flow of reactants through said annular enclosure, said apparatus comprising:

an internal manifold adjacent to said annular enclosure and comprising the internal space of the elongated enclosure limited by the internal cylindrical wall of said enclosure;

an external feed space adjacent to said annular enclosure and formed of the space limited by the walls of the elongated enclosure and the external cylindrical wall of said annular enclosure;

an inlet communicating with the external feed space adjacent to said annular enclosure for feeding the reactants;

an outlet communicating with the internal manifold adjacent to said annular enclosure for discharging the reaction products;

a screen for impeding any discharge of reactants from said annular enclosure at the top of the internal manifold adjacent to said annular enclosure, said screen having a height of not less than 50% and not more than 400% of the distance between said internal wall and said external wall of said annular enclosure and having the shape of an inverted truncated cone of upwardly increasing section, said inverted truncated cone having the same axis as the internal cylindrical wall of said annular enclosure, the area of the smaller of the two bases of the truncated cone being substantially equal to the area of the cross-section of the internal cylindrical wall of said annular enclosure and the angle formed by the axis of this truncated cone with any one of its generatrices, being not more than 55°.

2. An apparatus according to claim 1, in which the angle formed by the axis of the truncated cone and one of its generatrices is not less than 10° nor more than 30°.

3. An apparatus according to claim 1, also including a perforated cylindrical internal distributor between the internal wall of said annular enclosure and the internal manifold of said annular enclosure, the surface of the perforations of said distributor being not less than 2% or more than 7 % of the total surface of the perforated wall.

4. An apparatus according to claim 3, wherein the perforated distributor extends upwardly beyond the lower level of the screen by a length not less than 10% and not more than 40% of the height of the screen.

5. An apparatus according to claim 3, in which the area of the perforations of the portion of the perforated distributor located near the foot of the screen is 1.5 to 4 times that of the other perforations of the perforated distributor.

6. An apparatus according to claim 5, wherein the perforated distributor extends upwardly beyond the lower level of the screen by a length not less than 10% and not more than 40% of the height of the screen.

7. An apparatus according to claim 1, wherein the upper portion of the external wall of said annular enclosure has the shape of a truncated cone having a height of not less than 10% and not more than 40% of said annular enclosure, the section of said truncated cone increasing downwardly, the larger base of said truncated cone being substantially equal to the section of said external cylindrical wall of said annular enclosure, and the angle formed by the axis of said truncated cone with one of its generatrices being not less than 2° and not more than 55°.

8. An apparatus according to claim 7, in which the area of the perforations of the portion of the perforated distributor located near the foot of the screen is 1.5 to 4 times that of the other perforations of the perforated wall.

9. An apparatus according to claim 7, wherein the perforated distributor extends upwardly beyond the lower level of the screen by a length not less than 10% and not more than 40% of the height of the screen.

* * * * *